United States Patent [19]
Zweegers

[11] 3,715,873
[45] Feb. 13, 1973

[54] HARVESTING AND ENSILAGE CUTTING APPARATUS

[76] Inventor: Petrus Wilhelmus Zweegers, Geldrop, Nieuwendijk, 46, Netherlands

[22] Filed: Nov. 23, 1971

[21] Appl. No.: 201,296

[30]    Foreign Application Priority Data

Nov. 23, 1970    Netherlands .................7017081
March 3, 1971    Netherlands .................7102855
Sept. 7, 1971    Netherlands .................7112316

[52] U.S. Cl. ..............................56/13.4, 56/503
[51] Int. Cl. ......................A01d 55/26, A01d 49/00
[58] Field of Search.......56/500, 501, 502, 503, 13.9, 56/14.3, 13.4

[56]    References Cited
UNITED STATES PATENTS

2,657,513    4/1953    Martin..................................56/13.4
3,090,188    5/1963    Gorham................................56/503
1,779,020    10/1930   Swint...................................56/503
3,455,094    7/1969    Gorham................................56/503

Primary Examiner—Russell R. Kinsey
Attorney—Watson, Cole, Grindle & Watson

[57]    ABSTRACT

Harvesting and ensilage cutting apparatus, comprising a chopper rotor in a housing with a front inlet opening, a pair of cooperating feed rolls mounted for counterrotation about substantially vertical axes closely in advance of said front inlet opening, stalk cutting means below said pair of feed rolls and a pair of forwardly extending guide means for guiding row crop toward said pair of feed rolls.

26 Claims, 17 Drawing Figures

HARVESTING AND ENSILAGE CUTTING APPARATUS

My invention relates to a harvesting and ensilage cutting apparatus for row crops such as corn.

Known apparatus for harvesting row crops such as corn and simultaneously cutting the crop into small pieces are complicated and comprise a large number of rotary and/or reciprocatory elements.

It is an object of the invention to provide a simple, reliably operating apparatus for the above purpose. This object is attained according to the invention by providing a harvesting and ensilage cutting apparatus comprising a chopper rotor in a housing with a front inlet opening, a pair of cooperating feed rolls mounted for counter-rotation about substantially vertical axes closely in advance of said front inlet opening, stalk cutting means below said pair of feed rolls and a pair of forwardly extending guide means for guiding row crop to said pair of feed rolls.

Said apparatus is of simple construction and ensures a correct feed of the cut stalks into the chopper. For the stalks, after having been severed, are immediately grasped by the pair of feed rolls, which feed it positively into the chopper at a constant accurately determined speed.

According to a further feature of the invention, the stalk cutting means comprise a series of knives distributed around the lower edges of the pair of feed rolls and cooperating in a shear cut with a counter knife. Although it is conceivable that the knives of one feed roll serve as counter knife for the knives of the other feed roll, it is preferred to mount a separate stationary counter knife transversely under the pair of feed rolls, whereas the knives of the pair of feed rolls intermesh without touching each other, such that the counter knife cooperates alternately with knives of the two feed rolls. Preferably the cutting edge of the stationary counter knife is situated substantially in the plane which contains the axes of the two feed rolls. Thus, the stalks are reliable severed in the nip between the two feed rolls so that they can be grasped immediately by the two rolls to be fed into the inlet opening of the chopper.

In known apparatus, bulky and complicated guide means are mounted near the feed means for obtaining a reliable guidance through the feed means of the sometimes very long and topheavy plants with tend to fall on the earth after their stalks have been severed. However, it is preferred according to the invention to have the periphery of the pair of feed rolls disengaged at their front and outer side parts and to shield only the outer parts of the cutting circles of the knives at the lower edges of the feed rolls. This shielding may be obtained by a pair of guide means which extend forward from the housing of the chopper and may be formed as a pair of flat arms extending along the lower edges of the pair of feed rolls. Even when the top of a cut plant lands on the earth sideways behind the feed rolls, its stalk is reliably grasped by the disengaged outer parts of the feed rolls and thus reliably fed into the inlet opening of the chopper.

The front part of the pair of forwardly directed guide arms may carry lateral projections which face each other and form supports for the cut plants and preferably almost touch each other in the center line between the pair of guide arms. These projections may be resilient or may be movably mounted so that they can yield when the pair of guide arms is moved along both sides of a row of standing plants.

A reliable feed by the pair of feed rolls may be ensured by providing said rolls with substantially longitudinally extending ribs distributed over the circumference of the rolls. These ribs may be inwardly movable with respect to the roll on which they are mounted and may for instance be spring biased to their outermost position.

Preferably a short duct having a substantially rectangular closed section connects the circumference of the pair of feed rolls with the inlet opening of the chopper housing. The rear edge of one of the upstanding sides of said duct may serve as counter knife for the knives of the chopper rotor, whereas the front edges of the sides of said duct may serve as scraper means for the feed rolls. If desired, the counter knife extending along one of the sides of said duct may be formed by a separate, quickly replaceable element which may be so mounted that it is accessible from the outside.

The knives of the rotating chopper rotor press the fed-in stalks against one of the sides of the connecting duct, the length of which between the front edge adjacent the associated feed roll and the rear edge serving as counter knife need not be more than a few centimeters. This enhances an even size of the small pieces obtained, because the stalks will be steadily fed towards the chopper knives.

DESCRIPTION OF PREFERRED EMBODIMENTS

The combined harvesting and ensilage cutting apparatus according to the invention is mounted on one end of a hollow transverse beam 1, extending sideways from a tractor and having at its other end coupling means for the three-point linkage system of the tractor 2. A belt drive 3 is mounted at the rear side of the transverse beam 1 for transmitting the drive from the power take-off shaft of the tractor 2, to the horizontal main shaft 4 of the machine. The main shaft 4 is journalled in a bushing attached to the beam 1, and fixed to its rear end it carries a pulley for the belt drive 3 and a chopper rotor 5 adjacent said pulley. The rotor 5 is enclosed in a housing 6. The rotor 5 comprises a disc 7 of sheet metal attached to a bushing 8, which is fixed on the shaft 4. The disc 7 carries a plurality of regularly distributed, radially directed angle irons 9, each of which carries a chopper knife 10 of L-section, the forward edge of which is sharpened to form a radially directed cutting edge. The cutting edges of the knives 10 cooperate with the rear edge of a stationary knife 11 fixed against the side wall of a rectangular channel 12 opening into the lower part of the housing 6. When looking on the front surface of the disc 7, it rotates counter-clockwise, whereas the knife 11 is fixed against the right side wall of the channel 12. When plants are fed into the channel 12, they are chopped into little pieces between the stationary knife 11 and the knives 10 of the rotor 5 which rotates at high speed.

The angle irons 9 and the knives 10 of the rotor 5 are so shaped that they also operate as an impeller for blowing the air and the finely divided pieces of the plants from the inlet opening 12 to a discharge stack 13 mounted on top of the housing 6. The discharge stack 13 is connected to a flexible tube 14, for instance a ribbed thermoplastic tube, which may be so directed that it discharges into a wagon riding alongside the machine.

Figures 2, 3:
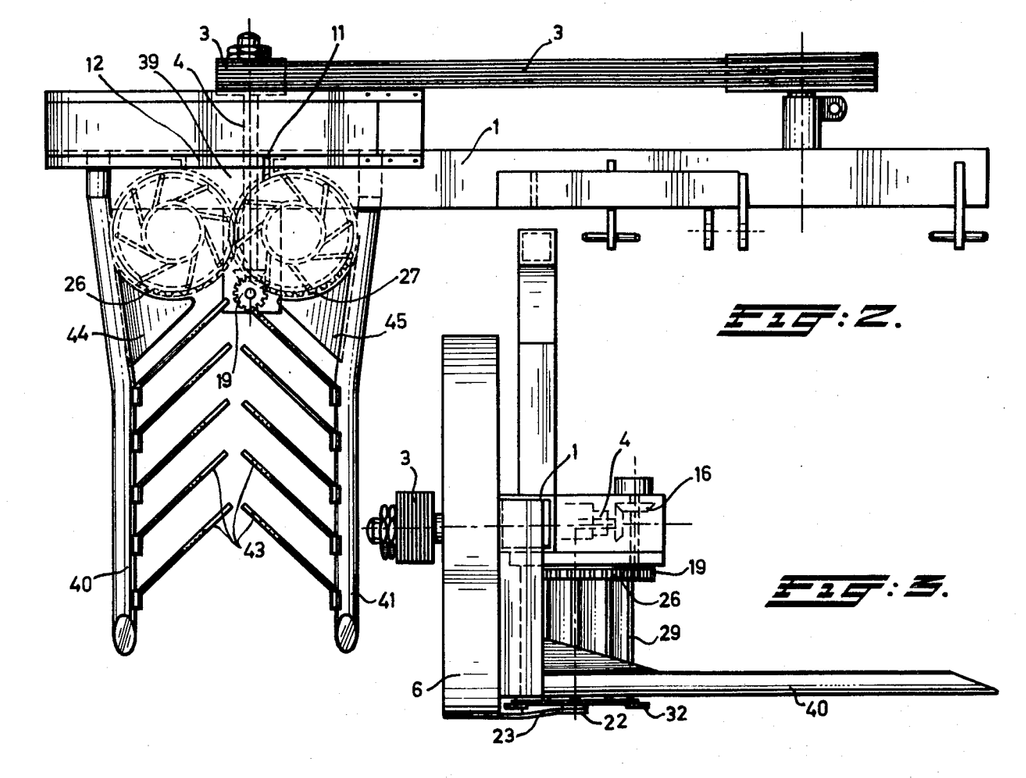
FIG. 2 is a view from above the machine of FIG. 1.
FIG. 3 is a side view of the machine according to FIG. 1.
Figure 4:
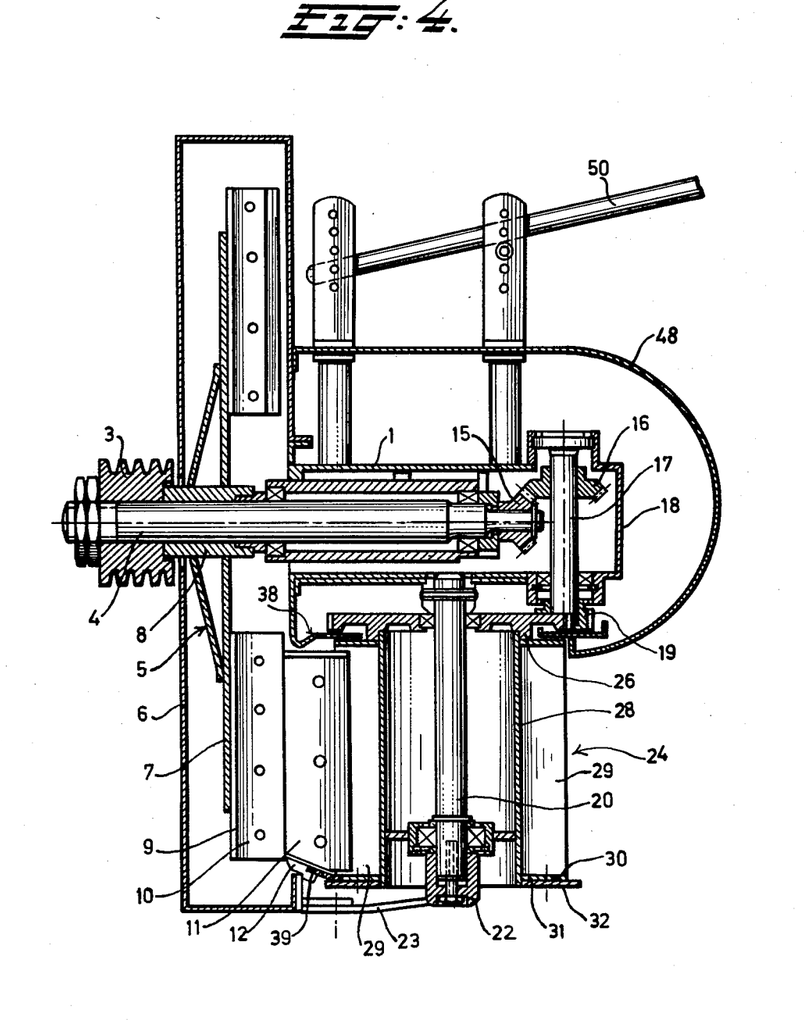
FIG. 4 is a view of the machine according to FIG. 1 in vertical section.

A bevel gear 15 is mounted on the front end of the main shaft 4 and cooperates with a bevel gear 16 mounted on a vertical auxiliary shaft 17 rotatably mounted in a frame part 18 directed forwardly from the main beam 1. A plain gear 19 is mounted on the lower end of the auxiliary shaft 17. The upper ends of two vertical shafts 20 and 21 are fixed to the underside of the frame part 18 and the lower ends of the shafts 20 and 21 are fixed in bushings 22 mounted at the forward end of horizontal support 23, the rear end of which is fixed to the housing 6. Feed rolls 24 and 25 are rotatably mounted on the shafts 20 and 21, and plain gears 26 and 27 are fixed to the upper end of the feed rolls. The gear 19 on the auxiliary shaft 17 meshes with the gear 27 (FIG. 2) and the gear 27 meshes with the gear 26, so that the main shaft 4 when rotated cause a synchronous counterrotation of the two feed rolls 24, 25 via the auxiliary shaft 17.

Figure 1:
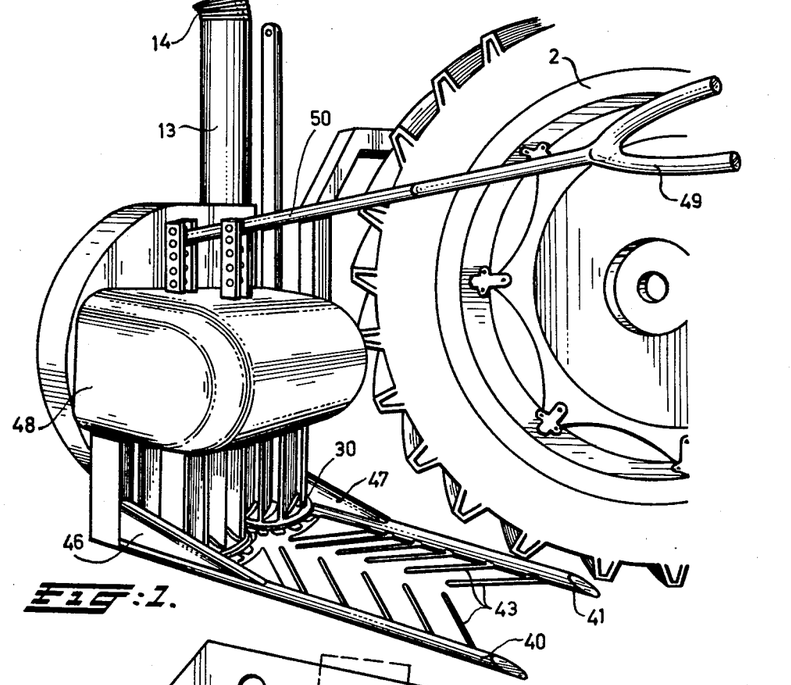
FIG. 1 is a perspective view of a machine according to the invention, mounted at the right side of an agricultural tractor.

Each feed roll 24 or 25 comprises a cylinder 28 of smaller diameter than the gear 26 or 27, and a flange 31 mounted to the lower end of the cylinder. Each cylinder 28 carries eight flat ribs 29 which extend between the gear 26 or 27 and the flange 31 and are inclined outwardly and rearwardly with respect to a radius. The ribs 29 extend over the full height of the cylinder 28 and an upwardly inclined strip 30 is mounted in the corner between the front of each rib 29 and the flange 31, see FIG. 1.

Figure 5:
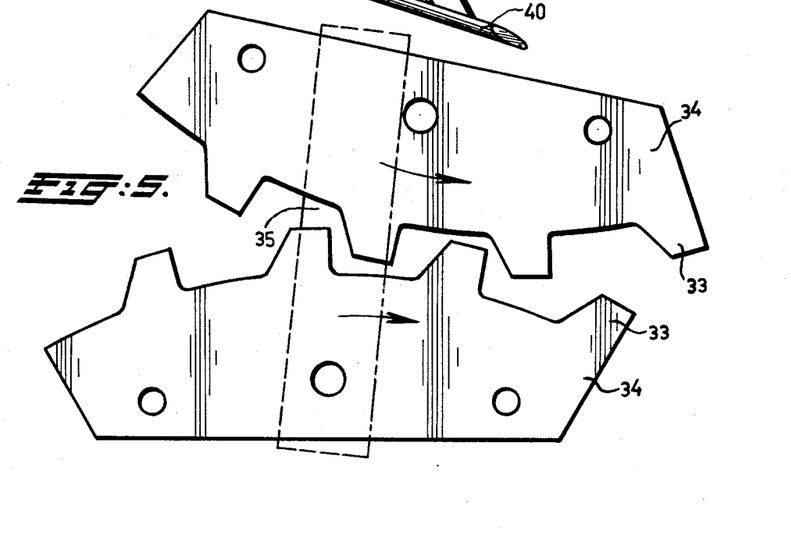
FIG. 5 shows the stalk cutting means in detail.

A cutting disc 32 provided with cutting teeth 33 is mounted under the flange 31 of each feed roll 24 and 25. Each cutting disc 32 comprises six equal contiguous segments 34, see FIG. 5. The dimensions of the cutting discs 32 and their teeth 33 are so chosen that the teeth 33 of the two feed rolls 24, 25 intermesh without touching each other. In the nip between the two feed rolls, the two cutting discs 32 rotate rearwardly. The cutting edges of the teeth 33 are radially directed and the rear edges of the teeth are inclined. A stationary knife 35 (FIG. 6) fixed to the front edge of the support 23 between the two bushings 22 rests against the underside of the two cutting discs 22. The front edge of the stationary knife 35 cooperates in a shearing action with the radial cutting edges of the teeth 33.

Figure 6:
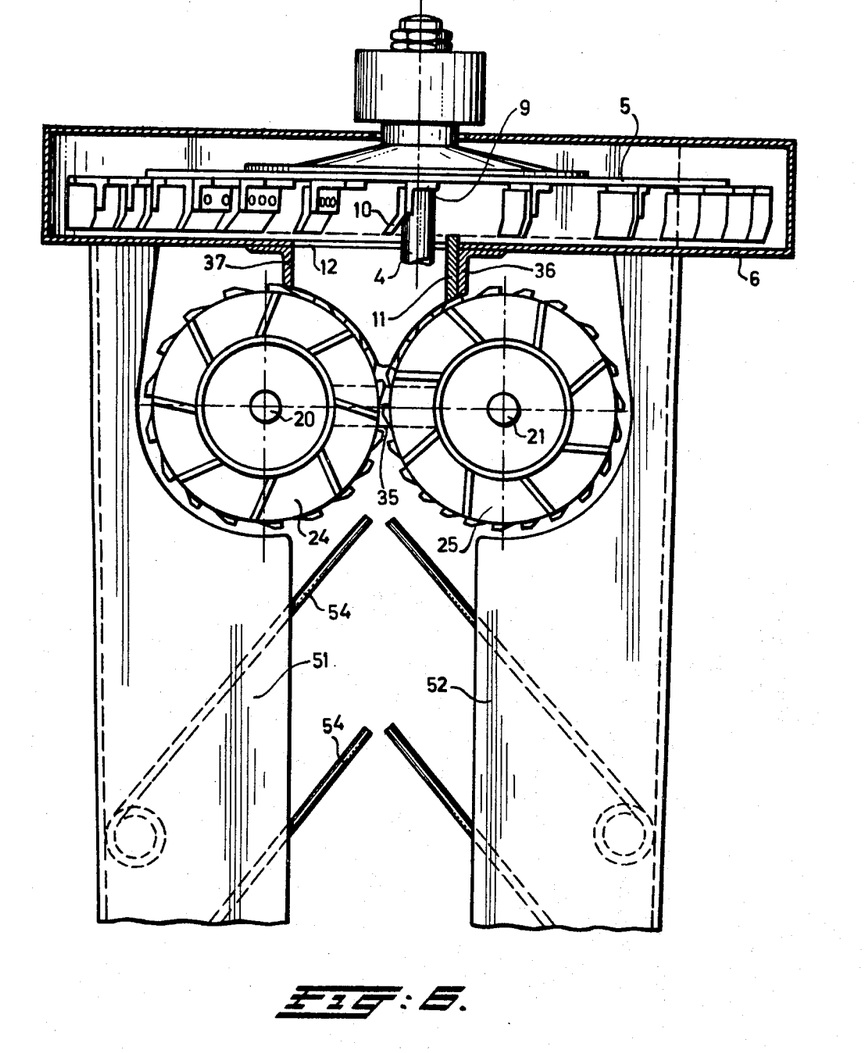
FIG. 6 is a view from above of part of the machine according to FIG. 1, partly in section, with another embodiment of the guide arms.
Figure 7:
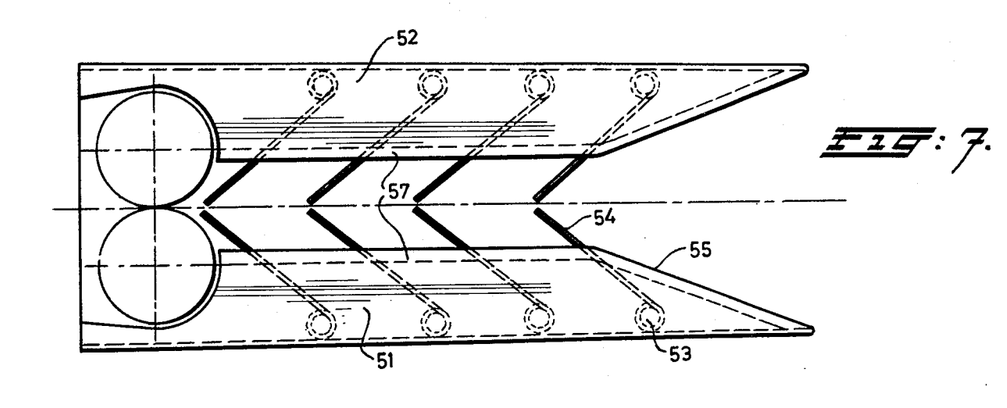
FIG. 7 is a view from above of the guide arms according to FIG. 6, FIGS. 8 and 9 are a side view and transverse section respectively of a guide arm according to FIGS. 6 and 7, FIGS. 10 and 11 are views from above of other embodiments of the pair of guide arms.
Figure 8:
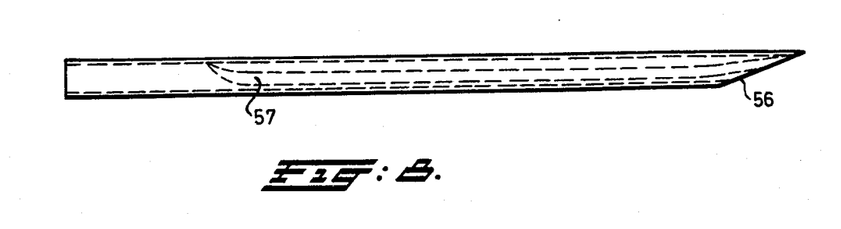
Figure 9:
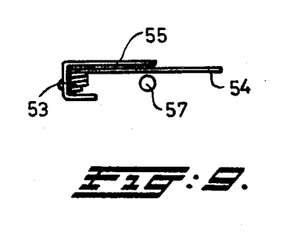

As shown in FIG. 6, the pair of feed rolls 24 and 25 are mounted in advance of the inlet opening 12 of the chopper rotor 5 with their nip somewhat displaced to the left with respect to the main shaft 4, whereas the inlet opening 12 is displaced somewhat farther to the left. The stationary knife 11 fixed against the right side wall of the inlet opening 12 extends with its front edge up to the outer edge of the ribs 29 of the roll 25 so as to serve as a doctor means for plant parts clinging to the ribs 29. The stationary knife 11 is fixed to an angle iron 36 which is itself fixed to the front wall of the housing 6. Another angle iron 37 is fixed along the left side of the inlet opening 12 and serves as a doctor means for the ribs 29 of the roll 24. The upper wall of the inlet channel is formed by a plate 38 which is an extension of the upper edge of the inlet opening 12 and extends between the gears 26 and 27 so as to substantially close the top of the inlet channel. A plate 39 is in a similar way provided between the lower edge of the inlet opening 12 and the outer edge of the flanges 31 of the rolls 24 and 25. Thus, a short, closed inlet channel for the plants extends between the rolls 24 and 25 and the inlet opening 12.

FIGS. 1 to 4 show an embodiment of the guide means comprising a pair of guide arms 40 and 41 extending forwardly from the housing 6 along the lower edge of the outer sides of the pair of feed rolls 24 and 25. The guide arms 40 and 41 have a length of almost 6 feet and end in a relatively sharp tip. At their inward sides, they carry inwardly and rearwardly inclined resilient tines 43, which extend almost to the center line between the two arms and almost touch each other. Guide plates 44, 45 with a rearwardly inclined front edge are mounted between the guide arms 40 and 41 respectively and the front part of the circumference of the rolls 24, 25, so that their rear edges are spaced with a small clearance from the lower flange 31 of said rolls 24, 25. The connection between the guide arms 40, 41 and the front wall of the housing 6 may be reinforced by triangular braces 46, 47, but it is important that these reinforcing braces 46, 47 have a small height so that the greater part of the height of the rolls 24, 25 is disengaged at the laterally outward part of their circumference.

A hood 48 is mounted on the frame part 18 and the top of the hood 48 carries supports for adjustable connection of the stem 50 of a forwardly directed fork shaped element 49.

The apparatus operates as follows:

The tractor 2 is driven along a standing row of stalks such as corn, in such a way that the row of plants passes between the resiliently yielding tines 43 of the guide arms 40 and 41. Stalks which do not grow exactly in the center line, contact the guide plates 44, 45 and are forced toward the center line, whereas the mounting of the machine itself has also a limited flexibility in a direction transversely to said center line so that the stalks are fed exactly into the nip between the pair of feed rolls 24, 25. Simultaneously, the fork 49 and the front wall of the hood 48 push the stalk to a forwardly inclined position. A few inches above the ground, the stalk is engaged by the teeth 33 of the cutting discs 32 of the pair of feed rolls 24, 25 and these teeth push the stalk against the stationary knife 35, where the stalk is cut in a shearing action. While the plant falls, its lower end is immediately grasped by the ribs 29 of the pair of feed rolls 24, 25. While the stalk of the plant is fed into the inlet opening 12 of the chopper rotor 5 by the pair of feed rolls 24, 25, the greater part of the plant falls on the tines 43 of the pair of guide arms 40, 41. It is not detrimental if part of the plant falls on the ground beside the guide arms, since it will engage the outer part of the circumference of the feed rolls 24, 25 and a plant which has fallen aside will thus reliably be grasped by the ribs of the rolls and drawn inwardly toward the chopper rotor. It is important that the ribs 29 of the two rolls 24, 25 are mutually offset (see FIGS. 2 and 6) to obtain a good feeding action toward the inlet opening 12. The plant is fed through the channel connecting the rolls 25, 24 with the inlet opening 12 and is chopped to little pieces by the knives 10 of the chopper rotor 5 and the stationary knife 11 against the side wall of the channel. The plant parts extending between the nip of the rolls 24, 25 and the inlet opening 12 move over the stationary knife 11 which acts as a scraper for stripping the plant parts from the roll 25 and also acts as a guide for guiding the plant parts to the rear cutting edge of the knife. The speed ratio between the rolls 24 and 25 and the rotor 5 can be so chosen that the plants are cut into very fine pieces, and because of the small distance between the pair of feed rolls and the chopper rotor, the plant parts are securely held so that it is avoided that large pieces can fall into the chopper housing. The mass of pieces is blown out of the chopper housing into a discharge stack 14 and is delivered into a waggon travelling alongside the machine.

The hood 48 preferably extends to a position over and in advance of the pair of feed rolls 24, 25, so that it holds the uncut stalks in a suitable inclined position in front of the nip of the pair of rolls 24, 25. This is important for reliably grasping the cut stalks since the fork 49 engages only the top part of the plants which can bend while the stalk remains upright.

Inside the hood 48, a known per se sharpening device may be mounted for sharpening the knives 10 of the chopper rotor. After sharpening, the clearance between the knives 10 and the stationary knife 11 can be adjusted by moving the chopper rotor 5 over the main shaft 4 towards the stationary knife 11 and tightening it again.

While the chopper rotor has a horizontal shaft in the described embodiment, it is also possible to use a chopper rotor with a vertical shaft. This has the advantage that the channel between the pair of feed rolls 24, 25 and the inlet opening 12 can be shorter, since the cylindrical forward part of the chopper rotor can be positioned closely adjacent the cylindrical rear parts of the rolls 24, 25. The speed of rotation of the pair of feed rolls 24, 25 is preferably 100 to a few hundred revolutions per minute, whereas the speed of rotation of the chopper rotor 5 is preferably appreciably higher.

In the embodiment according to FIGS. 1 to 4, the guide arms 40 and 41 have a closed circular section and the tines 43 are mounted on their periphery. In this embodiment, the tines have to carry a heavy load. FIGS. 6 to 9 show an embodiment, of the guide arms, in which the load on the tines is lower. In this embodiment, the guide arms 51, 52 have a channel section, the open sides of which face each other, and in the channels are mounted the coiled ends 53 of tines 54 of a type generally used for haymakers. As in the first embodiment, the tines are inwardly and rearwardly inclined and almost touch each other in the center line between the two guide arms 51, 52. The upper flange 55 of the channel section of the arms 51, 52 is extended toward the center line and replaces the guide plates 44, 45 of the first embodiment. The upper flange 55 protects a large part of the rearwardly inclined tines 54, whereas the tines are supported on a rod 57 fixed under the upper flange 55 and extending in longitudinal direction of the arms 51, 52. The channel section arms 51, 52 end forwardly in a relatively sharp pointed tip 56, the inner edges of the upper flanges 55 diverging toward the tops of the arms. Thus, the guide arms reliably catch the plants between them. The slot between the pair of flanges 55 narrows rearwardly so that these flanges guide the plants reliably toward the nip between the pair of feed rolls. At their rear ends, the upper flanges 55 closely follow the circumference of the lower ends of the pair of feed rolls 24, 25. Past the feed rolls 24, 25, the upper flanges 55 widen again so as to protect the cutting teeth 32 of the feed rolls 24, 25 and to obtain a strong connection with the housing 6.

Figure 10:
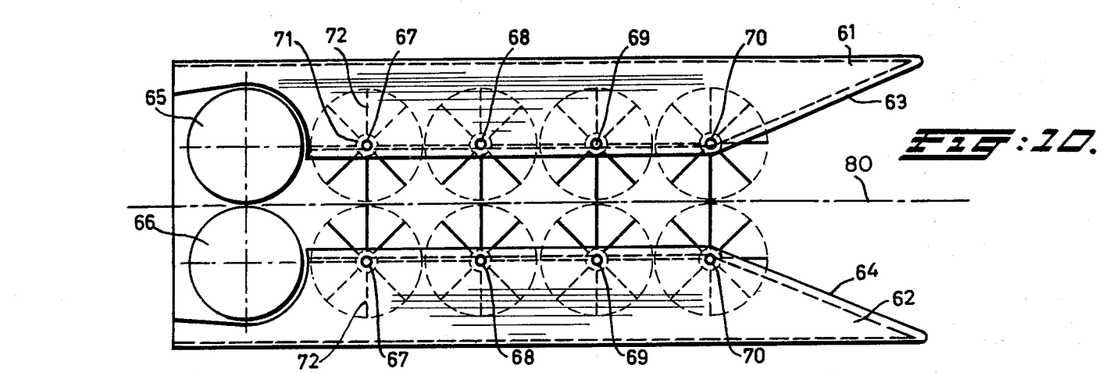
Figure 11:
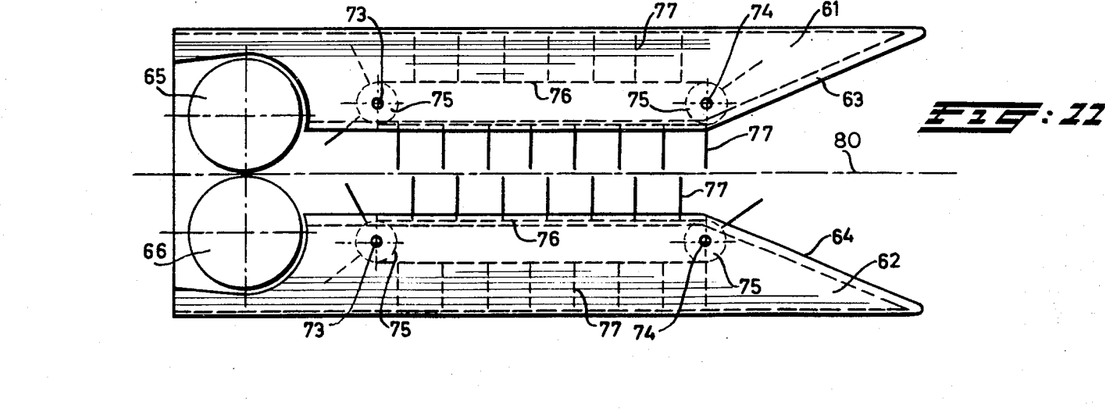

In the embodiments of FIGS. 10 and 11, the tines of the guide arms are movable by the plants which move toward the pair of feed rolls. Thus, the repeated flexing movement of the tines of the first described embodiments become unnecessary and danger of breakage of the tines is avoided.

In the embodiments of FIGS. 10 and 11 the pair of guide arms 61, 62 have the same general shape as the guide arms 51, 52 in the embodiment of FIGS. 6 – 9. A bar 63, 64, extends from the pointed tip of the arms 61, 62 respectively along and spaced from the inner edge of the upper flange of said arm 61, 62 and terminates short of the pair of feed rolls 65, 66.

In the embodiment according to FIG. 10, each bar 63, 64 carries four vertical shafts 67, 68, 69, 70 and a hub 71 is mounted for free rotation on each of said shafts. Each hub 71 carriers a plurality of radial tines, e.g. six, which are regularly distributed about the circumference of the hub. The tines 72 end just short of the center line 80 of the guide means so that they do not touch each other when rotated by the corn stalks passing between the pair of guide arms 61, 62.

In the embodiment according to FIG. 11 each bar 63 and 64 carries two vertical shafts 74 and 73 and a freely rotatable pulley or sprocket 75 is mounted on each of said shafts. An endless belt or chain 76 is trained around the two pulleys or sprockets 75 of each guide arm 61 and 62 and said belt or chain 76 carries a series of outwardly protruding tines 77. The tines 77 of the two belts or chains 76 end just short of the center line 80 of the guide arm arrangement so that the tines do not touch each other when moved by the uncut row of stalks passing between the guide arms 61 and 62.

Figure 12:
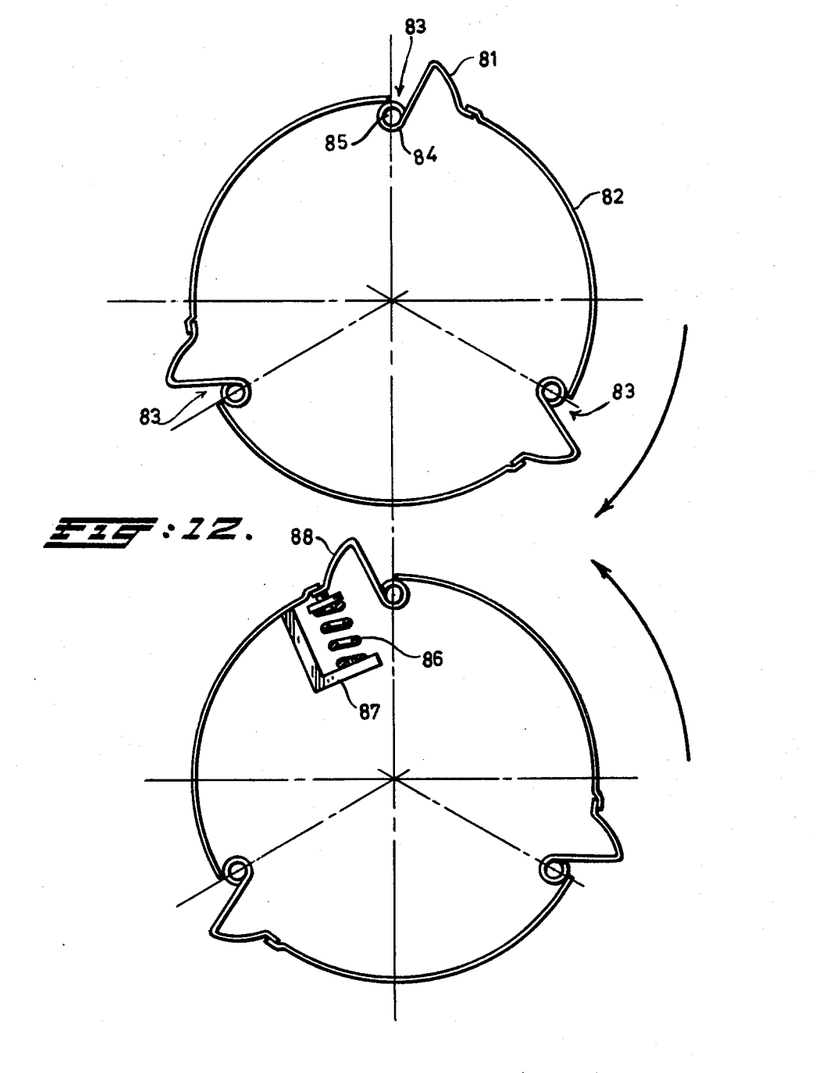
FIG. 12 is a horizontal section of another embodiment of the pair of feed rolls.

In the described embodiments, the feed rolls 24, 25 consisted of a rigid cylinder carrying a plurality of rigid ribs 29. Since the dimensions of the stalks and ears passing between the pair of feed rolls vary considerably, it may be advantageous to build the feed rolls and/or ribs of a yielding material such as rubber. In FIG. 12 another possibility is shown for obtaining a regular feed with varying dimensions of the thickness of the mass passing between the pair of feed rolls.

According to FIG. 12, the ribs 81 are retractable in radial direction into the cylinder 82 of the feed rolls. This has the advantage that both thick and thin stalks are held securely between the pair of feed rolls and are thus regularly fed into the chopper housing so that a regular chopping is obtained.

Each feed roll comprises a hollow cylinder 82 having a plurality of longitudinal slots 83 regularly distributed over its circumference. In the shown embodiment each cylinder has three slots. A rib 81 having substantially a V-section closes said slot 83 in that one edge of the ribs is formed into a hinge eye 84 pivotably mounted on a pin 85 fastened along the inner edge of one side of the slot. Viewed in the direction of rotation of the feed rolls (indicated by arrows), the pivot pins 85 ere fastened along the rear edges of the slots 83. The front edge (viewed in the direction of rotation) of each rib 81 is resiliently loaded in radial outward direction by a pressure spring 86 mounted in the hollow interior of the feed roll between said front edge and a L-shaped support 87, the extremity of which is fixed to the inner wall of the cylinder 82.

The front leg 88 of the V-section of the ribs 81 is curved with a radius having its center in the axis of the pivot pin 85, so that said front leg 88 closely follows the front edge of the slot 83, when the rib 81 is pushed inwardly by the plants grasped between the pair of feed rolls. Thus, no plant parts can penetrate into the hollow interior of the feed roll. Also, the front edge of the rib engaging the plants always has the same angular position with respect to the circumferential wall of the cylinder 82, so that a varying thickness of the mass grasped between the pair of rolls does not influence the manner of feeding caused by the ribs. Said angular position of the front leg 88 with respect to the cylinder wall is rearwardly directed with respect to the direction of rotation and is so chosen as to obtain a regular feed of the crop into the chopper rotor. By the construction described this direction is maintained for any position of adjustment of the ribs caused by a varying thickness of the mass of crop held between the feed rolls.

FIGS. 13 – 17 show an embodiment with a quickly replaceable counter knife for cooperation with the chopper knives. As stated, the knives of the chopper rotor itself can quickly be resharpened by a known per se sharpening device mounted on the machine, for instance within the hood 48, so that it can be moved to a position in which it engages the rotating knives of the chopper rotor. However, the stationary counter knife mounted in the inlet opening of the chopper housing is not readily accessible in the earlier described embodiments and thus, it may be preferable to provide a quickly replaceable easily accessible counter knife as described below.

Figure 13:
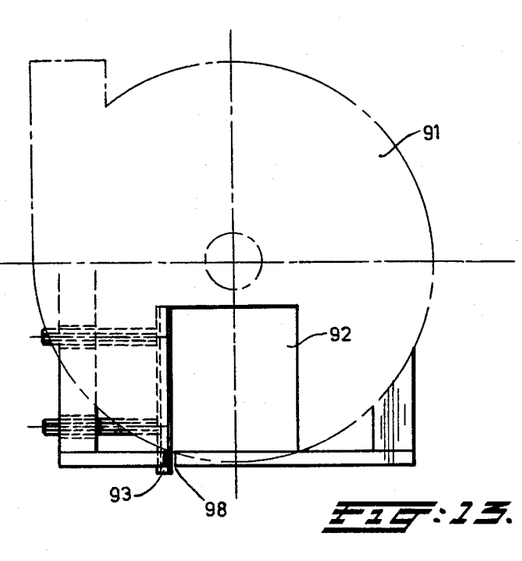
FIG. 13 is a front view of the chopper housing with another embodiment of its counterknife.
Figure 15:
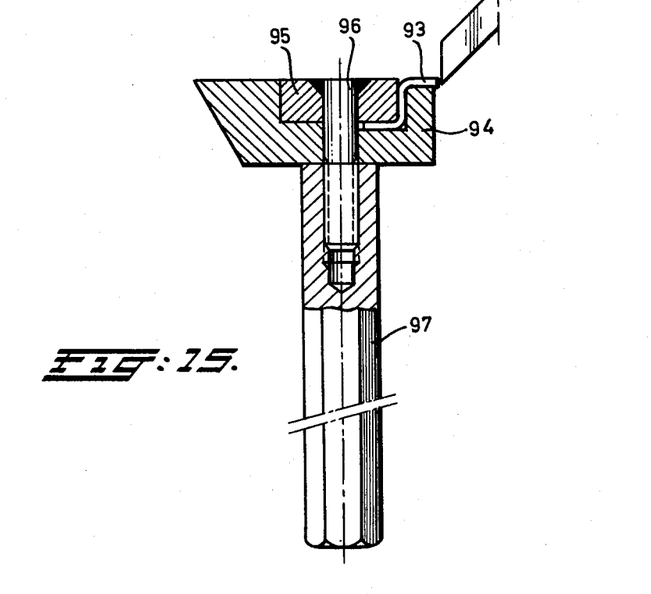
FIG. 15 is a horizontal section at enlarged scale of a detail of the counterknife mounting according to FIG. 14, FIGS. 16 and 17 show other shapes of a counterknife suitable for being used in an embodiment according to FIG. 13.
Figure 16:
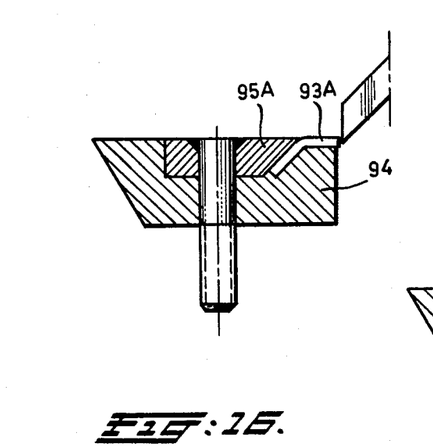
Figure 17:
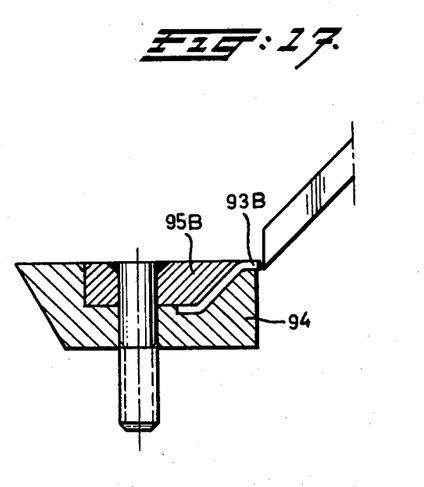

In FIG. 13, the chopper housing 91 is indicated in phantom lines. The rectangular inlet opening 92 is positioned below the shaft of the chopper. The counter knife 93 is located along the left side of the inlet opening 92. In this embodiment the counter knife 93 is made of hard steel strip and, as shown in FIG. 15, clamped between the side wall 94 of the inlet opening 92 and a clamping piece 95 mounted in an interior recess of the side wall 94. The clamping piece 95 comprises an elongated rectangular block fitting in a corresponding slot extending over the height of the side wall 94, the counter knife 93 being bent to Z-shape and the flange of said counter knife being clamped between the slot and the clamping piece. FIGS. 16 and 17 show counter knives 93A, 93B of a different shape, for instance with an inclined flange, and adapted shapes of the clamping pieces 95A, 95B.

The side wall 94 of the inlet opening 92 comprises a series of through holes, through which extend screws 96 welded to the clamping piece 95. Nuts 97 are screwed on the outwardly extending ends of the screws 96 and clamp the clamping piece against the counter knife and in the slot of the side wall. The nuts 97 are elongated so as to be readily accessible from the exterior.

The lower end part of the counter knife 93 or 93A or 93B extends downwardly through a slot 98 of corresponding shape provided in the lower wall of the inlet opening 92. After loosening the nuts 97, the counter knife 93 or 93A or 93B can be removed by pulling it downwardly through the slot 98. In the embodiment shown the counter knife 93 or 93A or 93B has a symmetrical shape and it has cutting edges along two parallel longitudinal side edges, so that after removing the counter knife, it can be rotated over 180° and reinserted so that the second longitudinal edge can be used as cutting edge. After both cutting edges are worn, the knife may be disposed off.

Figure 14:
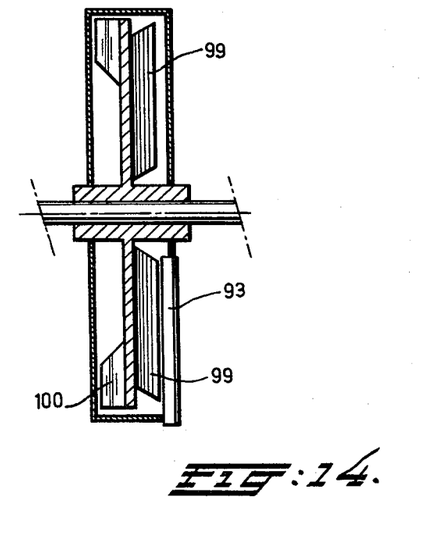
FIG. 14 is a cross section of the parts shown in FIG. 13.

FIG. 14 shows the knives 99 of the chopper rotor which cooperate with the counter knife 93, and also the vanes 100 mounted to the opposite face of the disc shaped rotor so as to serve as a fan.

What I claim is:

1. Harvesting and ensilage cutting apparatus comprising a chopper rotor in a housing with a front inlet opening, a pair of cooperating feed rolls mounted for counter-rotation about substantially vertical axes closely in advance of said front inlet opening, stalk cutting means below said pair of feed rolls and a pair of forwardly extending guide means for guiding row crop toward said pair of feed rolls in which said stalk cutting means comprise a counter knife and an annular series of knives mounted against the lower end of each of the two feed rolls for cooperation of each of said knives with said counter knife in a shearing action.

2. Apparatus according to claim 1, in which said knives cooperate with the counter knife which is stationary and mounted transversely under the pair of feed rolls, the knives of the two rolls intermeshing without touching each other, such that the counter knife cooperates in alternation with knives of the two feed rolls.

3. Apparatus according to claim 2, in which the cutting edge of the counter knife is disposed substantially in the plane containing the axis of the pair of feed rolls.

4. Apparatus according to claim 1, in which a short duct forms a substantially closed passage between the periphery of the pair of feed rolls and the inlet opening of the chopper housing.

5. Apparatus according to claim 4, in which a separate, quickly replaceable counter knife is mounted along the rear edge of one of the side walls of said duct.

6. Apparatus according to claim 5, in which said last mentioned counter knife extends through a slot in the lower wall of said duct.

7. Apparatus according to claim 5, in which a clamping piece holds said last mentioned counter knife in a longitudinal slot of the associated side wall of the inlet duct.

8. Apparatus according to claim 5, in which the last mentioned counter knife comprises a hardened steel strip and is bent along at least one longitudinal line.

9. Apparatus according to claim 8, in which the cross section of the last mentioned counter knife is symmetrical such that two parallel longitudinal side edges can alternately be used as a cutting edge.

10. Apparatus according to claim 9, in which the operative part of the last mentioned counter knife extends along the side wall of the inlet duct and the remaining part of the counter knife is enclosed between the clamping piece and the slot in the side wall of the inlet duct.

11. Apparatus according to claim 4, in which the rear edge of one of the upstanding side walls of said duct serves as a counter knife for the chopper rotor knives.

12. Apparatus according to claim 1, in which the outlet of the chopper rotor is connected to a flexible ribbed thermoplastic discharge tube.

13. Apparatus according to claim 3, in which the outer portions of the cutting circle of the knives at the lower edges of the feed rolls are shielded by said pair of guide means which extend forwardly from behind the feed rolls along the outer edges of the feed rolls.

14. Apparatus according to claim 1, in which said guide means include guide arms of channel section, the upper flange of each channel section guide arm having an inner edge which is curved at its rearward end, said curved end being slightly spaced from the associated feed roll for shielding the knives at the lower edge of each feed roll.

15. Apparatus according to claim 1, in which said guide means include guide arms, rearwardly and inwardly inclined tines being mounted at one end on said guide arms, the free ends of the tines on the respective guide arms being spaced from one another at the centerline between said guide arms, and the tines being resiliently secured to said guide arms.

16. Apparatus according to claim 1, in which said guide means include guide arms, movable extensions mounted on said guide arms adapted to be moved rearwardly by the stalks passing between said pair of guide arms.

17. Apparatus according to claim 16, wherein a plurality of vertical shafts are mounted on each said guide arm, and outwardly extending tines being mounted for free rotation on each said shaft.

18. Apparatus according to claim 1, in which a plurality of longitudinally extending ribs are mounted along the circumference of each of the pair of feed rolls.

19. Apparatus according to claim 18 wherein a peripheral flange is mounted at the lower end of each feed roll, and a forwardly inclined strip is mounted in the corner between the front surface of each said rib and said flange at the lower end of each feed roll.

20. Apparatus according to claim 18, in which said ribs are mounted to the periphery of each feed roll so as to be displaceable in a substantially radial direction.

21. Apparatus according to claim 20, in which the cross section of each said rib is V-shaped with their open ends facing inwardly.

22. Apparatus according to claim 20, in which the ribs are outwardly spring biased.

23. Apparatus according to claim 20, in which the rear edge of each rib, viewed in the direction of rotation of the associated feed roll, is pivotably connected with said roll.

24. Apparatus according to claim 20, in which the periphery of each feed roll is provided with a series of longitudinally extending slots in which the radially displaceable ribs are so mounted that they close the associated slot in any assumed position of the rib with respect to the roll.

25. Apparatus according to claim 24, in which the front leg of the V-shaped cross section of each rib, viewed in the direction of rotation, is bent with a radius of curvature, the center of which substantially coincides with the pivot axis of the rib.

26. Apparatus according to claim 22, in which the ribs are spring biased by torsion springs extending in a longitudinal direction of the ribs.

* * * * *